US008904284B2

(12) United States Patent
Grant et al.

(10) Patent No.: US 8,904,284 B2
(45) Date of Patent: Dec. 2, 2014

(54) OBJECT PLACEHOLDERS IN ELECTRONIC DOCUMENTS

(75) Inventors: Scott A. Grant, Sunnyvale, CA (US); Dan Bernstein, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 163 days.

(21) Appl. No.: 13/037,863

(22) Filed: Mar. 1, 2011

(65) Prior Publication Data

US 2012/0226975 A1 Sep. 6, 2012

(51) Int. Cl.
G06F 9/38 (2006.01)
G06F 17/21 (2006.01)
G06F 17/24 (2006.01)

(52) U.S. Cl.
CPC ............ *G06F 17/243* (2013.01); *G06F 17/212* (2013.01)
USPC ........................................................ 715/273

(58) Field of Classification Search
USPC ........................................................ 715/273
See application file for complete search history.

(56) References Cited

U.S. PATENT DOCUMENTS

| 4,539,653 | A | 9/1985 | Bartlett et al. | |
| 5,451,111 | A | 9/1995 | Matsuhisa | |
| 6,281,986 | B1 * | 8/2001 | Form | 358/403 |
| 7,424,672 | B2 | 9/2008 | Simske et al. | |
| 7,810,028 | B2 | 10/2010 | Bell et al. | |
| 8,060,222 | B2 * | 11/2011 | Eldridge et al. | 700/83 |
| 8,214,750 | B2 * | 7/2012 | Hamilton et al. | 715/757 |
| 2010/0095226 | A1 * | 4/2010 | Subramanian et al. | 715/760 |
| 2010/0107091 | A1 * | 4/2010 | Amsterdam et al. | 715/760 |

* cited by examiner

*Primary Examiner* — Adam M Queler
*Assistant Examiner* — Tionna Burke
(74) *Attorney, Agent, or Firm* — Blakely, Sokoloff, Taylor & Zafman LLP (57) ABSTRACT

An electronic book ("eBook") reader application executing on an electronic device conserves non-volatile, random access memory by reading from non-volatile memory an electronic document page that includes text and at least one non-textual object (e.g., an image), storing the read electronic document page in volatile memory such that the at least one non-textual object is replaced with a placeholder that occupies less memory than the non-textual object (e.g., a blank rectangle having the same dimensions as the image), determining that the electronic document page stored in volatile memory is likely to be displayed imminently, and replacing the placeholder in the stored electronic document page with the non-textual object.

46 Claims, 5 Drawing Sheets

OBJECT PLACEHOLDERS IN ELECTRONIC DOCUMENTS

BACKGROUND

This disclosure relates to displaying and facilitating the manipulation of electronic content, for example, the text, images and/or other objects that make up an electronic book ("eBook") or other electronic document being read on an electronic device.

Much like an ordinary printed book, electronic books ("eBooks"), or more generally, electronic documents, can be used to present text and images to users. Instead of ink and paper, however, an electronic book is a collection of digital data that software, known as an electronic book reader application, can interpret and present on a display of an electronic device. A variety of electronic devices, such as desktop and notebook computers, eBook readers, tablet computers, smart phones and/or other mobile devices, are capable of running electronic book reader software. One available format for eBooks is defined by the "ePub" standard, which is maintained by The International Digital Publishing Forum (IDPF).

SUMMARY

Implementations of the subject matter described here may include various combinations of one or more of the following features. For example, an electronic device having a processor and memory, including both volatile memory and non-volatile memory, can be configured to execute an electronic document reading application that performs operations including reading from non-volatile memory an electronic document page that includes text and at least one non-textual object (e.g., an image), storing the read electronic document page in volatile memory such that the at least one non-textual object is replaced with a placeholder that occupies less memory than the non-textual object, determining that the electronic document page stored in volatile memory is likely to be displayed imminently, and replacing the placeholder in the stored electronic document page with the non-textual object.

The placeholder may preserve at least one characteristic of the non-textual object, for example, an image size that includes a height dimension and a width dimension. The placeholder may be a blank rectangle that has the same height and width dimensions as the image object that it replaces.

Determining that the electronic document page is likely to be displayed imminently may include determining that the stored electronic document page is immediately adjacent to an electronic document page that is currently being displayed. Alternatively, or in addition, determining that the electronic document page is likely to be displayed imminently comprises determining that the stored electronic document page is related to an electronic document page that is currently being displayed (e.g., the stored electronic document page is referenced by the currently displayed page).

Replacing the placeholder in the stored electronic document with the non-textual object may include retrieving the non-textual object from non-volatile memory and inserting the retrieved non-textual object in place of the placeholder. The placeholder may be one or more orders of magnitude smaller than the non-textual object.

Moreover, an electronic device having a processor and memory, including both volatile memory and non-volatile memory, can be configured to execute an electronic document reading application that performs operations including storing in volatile memory an electronic document page that includes text and at least one non-textual object (e.g., an image), determining that display of the electronic document page stored in volatile memory is unlikely to be imminent, and replacing the at least one non-textual object with a placeholder that occupies less memory than the non-textual object but which preserves at least one characteristic of the non-textual object (e.g., a blank rectangle that has the same dimensions as the image it replaces).

Determining that display of the electronic document page is unlikely to be imminent comprises determining that the stored electronic document page is two or more pages away from an electronic document page that is currently being displayed. Alternatively, or in addition, determining that display of the electronic document page is unlikely to be imminent comprises determining that the stored electronic document page is unrelated to an electronic document page that is currently being displayed.

The subject matter described herein can be implemented, among other ways, as a method, a system or other apparatus, an article bearing machine readable instructions or any combination thereof. Details of one or more implementations are set forth in the accompanying drawings and the description below. Other features, aspects and advantages will be apparent from the description and drawings, and from the claims.

DRAWING DESCRIPTIONS

Like reference symbols in the various drawings indicate like elements.

DETAILED DESCRIPTION

Figure 1:
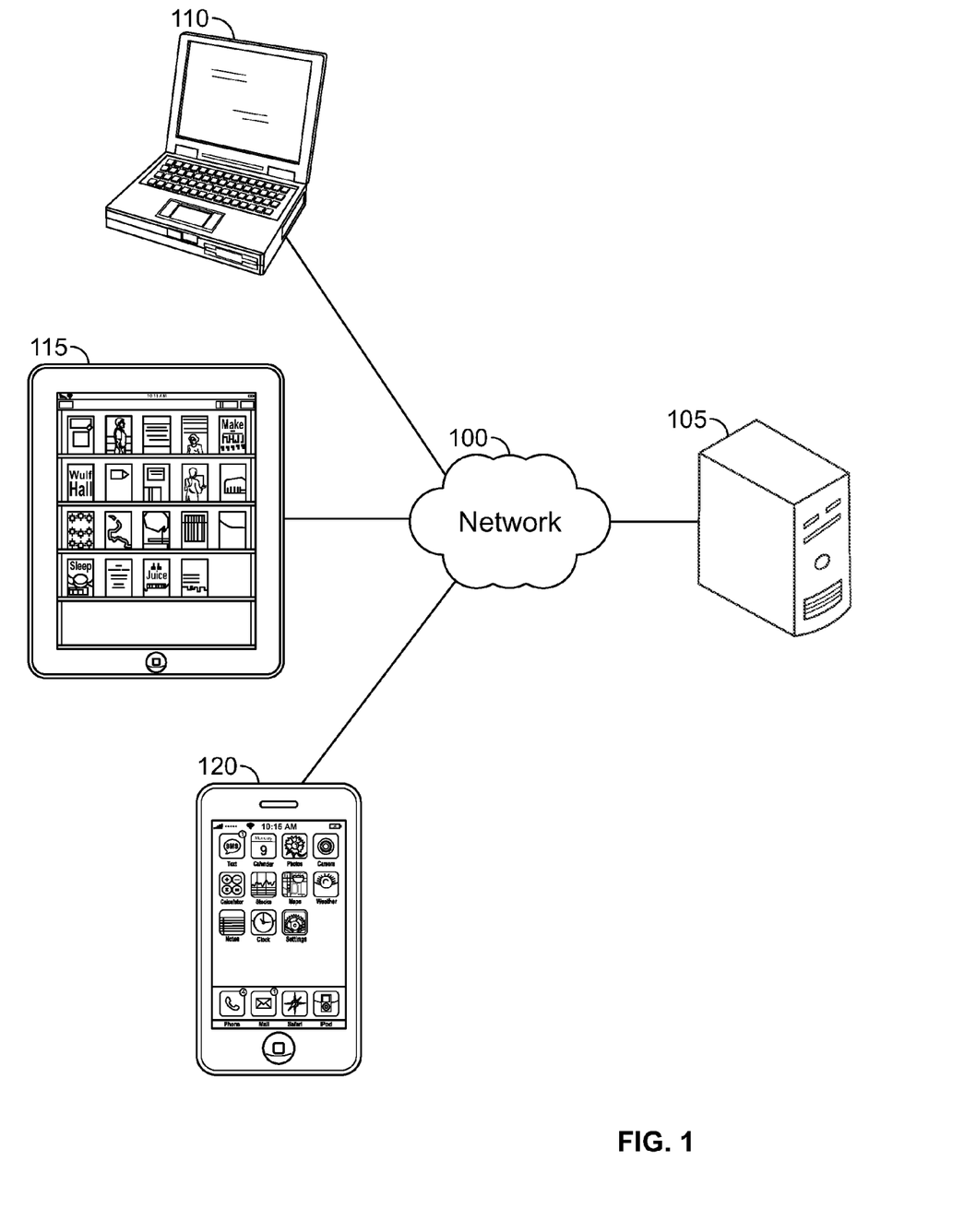
FIG. 1 illustrates examples of different types of electronic devices that can be configured to access, via a network, items of digital media residing on a computer system controlled by a content provider.

As shown in FIG. 1, any of several different types of electronic devices (e.g., notebook computer 105, a tablet computer or eBook reader 115, smart phone 120) may be configured to access, via a network 100, items of digital media (e.g., eBooks, movies, songs or the like) residing on a computer system controlled by a content provider 105 (e.g., an online web site that sells eBooks and/or other types of digital media). A user of such an electronic device can view, purchase and download eBooks—or other electronic documents—from the content provider 105 and then use an eBook Reader software application residing on the electronic device to read or otherwise peruse the purchased eBook.

While essentially all eBooks and other electronic documents include readable text in a particular language (e.g., English), many eBooks also include objects other than text including visual objects, such as movies or images, but potentially also other types of objects such as sounds or applets, the latter of which can provide essentially any functionality implementable on an electronic device.

In general the most common non-textual objects that appear on eBook pages are still images, for example, digitized photographs, drawings, paintings, or other graphics such as pie charts and other diagrams. Such images, which typically are encoded in one of the standard image formats such as JPEG, GIF, TIF, PNG and the like, are embedded by the eBook author or publisher among an eBook's textual portions, much in the same manner that images appear in paper and ink books. As such, an image on an eBook page typically comprises a substantial, or at least non-trivial, portion of the eBook page on which it appears and thus must be taken into account by an eBook reader application when paginating a book for subsequent rendering on the display of the device on which the eBook reader application is executing.

Figure 2:
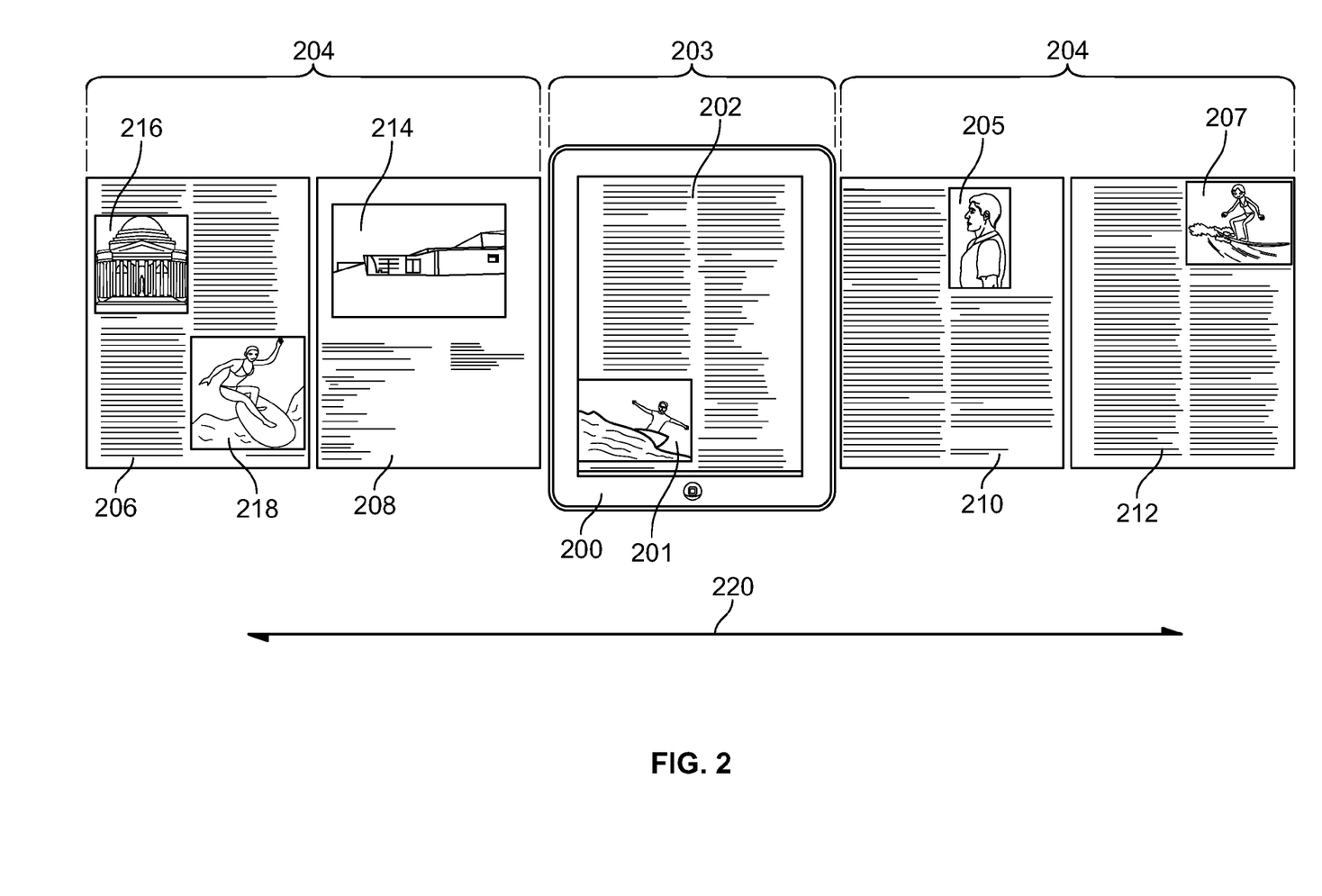
FIG. 2 is a diagram illustrating how images or other objects in an electronic document can be dynamically swapped in and out with placeholders depending on which page a user is currently viewing.

FIG. 2 illustrates a technique that may be used for displaying image-bearing eBook pages on an electronic device 200 executing an eBook reader application. As shown therein, the eBook reader is currently displaying a single eBook page 202, which includes both text and an image 201. While being displayed, the contents of the eBook page 202 are stored in RAM (Random Access Memory), specifically an onscreen portion 203 of RAM. Similarly, content (e.g., text and images) corresponding to non-displayed eBook pages—such as pages 206, 208, 210 and 212 in FIG. 2—also are stored in RAM albeit in offscreen portions 204 of RAM. Depending on the overall size of the eBook in question, and the memory capacity of the electronic device on which the eBook reader is executing, typically at least a portion, and perhaps a majority, of an eBook's content will remain stored only in non-volatile memory (e.g., a hard drive or FLASH memory) on the electronic device while the eBook is being read.

Because access times for non-volatile memory tend to be significantly slower than access times for RAM, an eBook reader application typically stores one or more eBook pages adjacent to the currently displayed eBook page in RAM so that when the user flips to the next page (or back a page), the eBook reader is able to display the next or previous page without appreciable delay from the user's perspective. But because electronic devices—especially mobile electronic devices such as smart phones, table computers and dedicated eBook reader devices—necessarily have a finite and limited amount of RAM, and because an eBook reader application typically must share that limited amount of RAM with other processes executing on the electronic device, it tends to be beneficial for an eBook reader application to conserve RAM whenever feasible, at least to the extent that such conservation does not unduly interfere with functionality or the user experience.

As illustrated in FIG. 2, one way an eBook reader application can conserve—and thus wisely use—limited RAM is to selectively replace the eBook's relatively large-sized content objects (e.g., images) residing on offscreen eBook pages with placeholders that are significantly smaller, and thus occupy significantly less RAM, than the images themselves. As shown in FIG. 2, the currently displayed eBook page 202 includes and displays its image 201 so it can be seen by the user, as do the two offscreen pages 208 and 210 immediately adjacent to the currently displayed page 202. However, offscreen pages more than one page away from the currently displayed page 202—that is, pages 206 and 212 in the example shown—have their respective images 207, 216 and 218 temporarily replaced with placeholders, e.g., blank rectangles, while residing in offscreen RAM 204. As a result, each image in offscreen RAM 204 that is temporarily replaced with a placeholder represents a significant savings in RAM space. For example, a typical image can easily be 2 Megabytes (MB) or larger whereas a placeholder such as a blank rectangle typically occupies only about 20 bytes, meaning that the space saving is on the order of several orders of magnitude.

As noted above, replacement of images with placeholders is only temporary—the actual images must be swapped back in for the placeholders before the eBook page or pages containing the images are displayed to the user. Accordingly, in the example shown in FIG. 2, assume that the user has finished reading eBook page 202 and performs an appropriate action (e.g., on a touch-screen capable device, swiping his or her finger across the screen) to cause the eBook reader to transition to the next page. Assuming the reader in this example signals a desire to move forward in the eBook to the adjacent page 210, the eBook reader would respond by updating the display to show page 210, including both its text and image 205. In conjunction with that transition, the eBook reader also would swap out the placeholder 207 on page 212 and insert the actual image corresponding to placeholder 207 (typically by reading the image from non-volatile memory, decrypting or decoding it if necessary, and overwriting the portion of offscreen RAM corresponding to placeholder 207). In that manner, eBook page 212, which is now immediately adjacent to the currently displayed page 210, is complete and ready for quick display should the user once again move forward one page in the eBook.

In addition, as a result of the current page change from 202 to 210, offscreen page 208 is now more than one page away from the currently displayed page 210. Consequently, in order to conserve RAM, image 214 appearing on offscreen page 208 is replaced with a placeholder, for example, a blank rectangle having the same dimensions as image 214.

Although the exemplary implementation illustrated in FIG. 2 swaps out images for blank rectangles for all pages in offscreen RAM that are more than one page away from the currently displayed page, alternatively an eBook reader implementation could use essentially any other threshold (i.e., any other number of pages away from currently displayed page) for performing such swapping, for example, either zero (i.e., all images in offscreen RAM are replaced with placeholders) or three or more pages away, meaning that two pages on either side of the currently displayed page have their respective images (and text) loaded in offscreen RAM. An advantage of having at least one page on either side of the currently displayed page complete with images in offscreen RAM (as in the example described above) is that it helps avoid visual blips, interruptions or other disconcerting visual effects that could occur if images were to be swapped in for placeholders concurrently with displaying the page on which the images appear. In this manner, ensuring that an immediately adjacent offscreen eBook page has it image or images swapped in for placeholders as soon as that page transitions into the immediately adjacent position (or in the parlance of baseball, the "on-deck" position) acts as a caching function that ensures smooth operation and a robust and positive user experience.

The swapping of images for placeholders, and vice versa, can be thought of as occurring dynamically, or on-the-fly, as a real time response to a user's interaction with an eBook. As a result, unnecessary image-placeholder swapping—that is, other than in response to user input—is minimized while the responsiveness and user-friendliness of the eBook reader application is enhanced.

As noted above, one type of image placeholder is a blank rectangle that has the same dimensions as the image it replaces. In addition to the RAM space saving advantage that such a placeholder provides, the fact that the blank rectangle has the same dimensions as its corresponding images provides another advantage, namely, it preserves pagination of the eBook. Otherwise, if the placeholder had other than the same dimensions as the image, whenever the image was to be swapped back in for the placeholder, the eBook reader application would have to repaginate the eBook, a process that tends to be time consuming and computationally intensive, and thus undesirable to have to be performed frequently or unnecessarily.

Some electronic devices that support eBook reader applications, such as the iPad® from Apple, Inc., are rotatable between a portrait orientation and a landscape orientation. Typically, when an electronic device is in a portrait orientation, an eBook reader application executing on that device displays a single eBook page at a time, such as shown in FIG. 2. In contrast, when the electronic device is in a landscape orientation, an eBook reader application executing on that device typically displays two side-by-side eBook pages at a time (not shown). In the latter case, the eBook reader application could be implemented to have the two adjacent pages on either side of the currently displayed page be loaded in offscreen RAM with their respective actual images so that when the user signals a page flip (which, in the landscape side-by-side pages display will cause both displayed pages to change) all of the images to be displayed post-page-flip will be ready for immediate display, thereby avoiding the above-noted visual disturbance that might otherwise occur if the images had to be read from non-volatile memory and loaded into onscreen RAM for display along with that page's text.

Implementations other than those described above may be used depending on design choices and preferences. For example, although the above examples were made with reference to swapping in/out images, a memory space and/or performance win may be realized by performing the placeholder swapping technique describe herein with eBook pages embedding essentially any other object of relatively large size. In addition, although the image/placeholder swapping examples described above are triggered based on proximity of adjacent offscreen pages, other swapping criteria (or equivalently, caching criteria) could be used beneficially depending, for example, on the type of electronic document being view and/or on the user's current location in the electronic document. For example, if a user was perusing the index (or table of contents) of an eBook, it might prove beneficial for the eBook reader application to load into offscreen RAM some or all of the eBook pages, along with their respective images, referenced on the index page currently being viewed, even though the pages to be cached were not necessarily adjacent, or perhaps even close, to the index page currently being viewed.

Figure 3A:
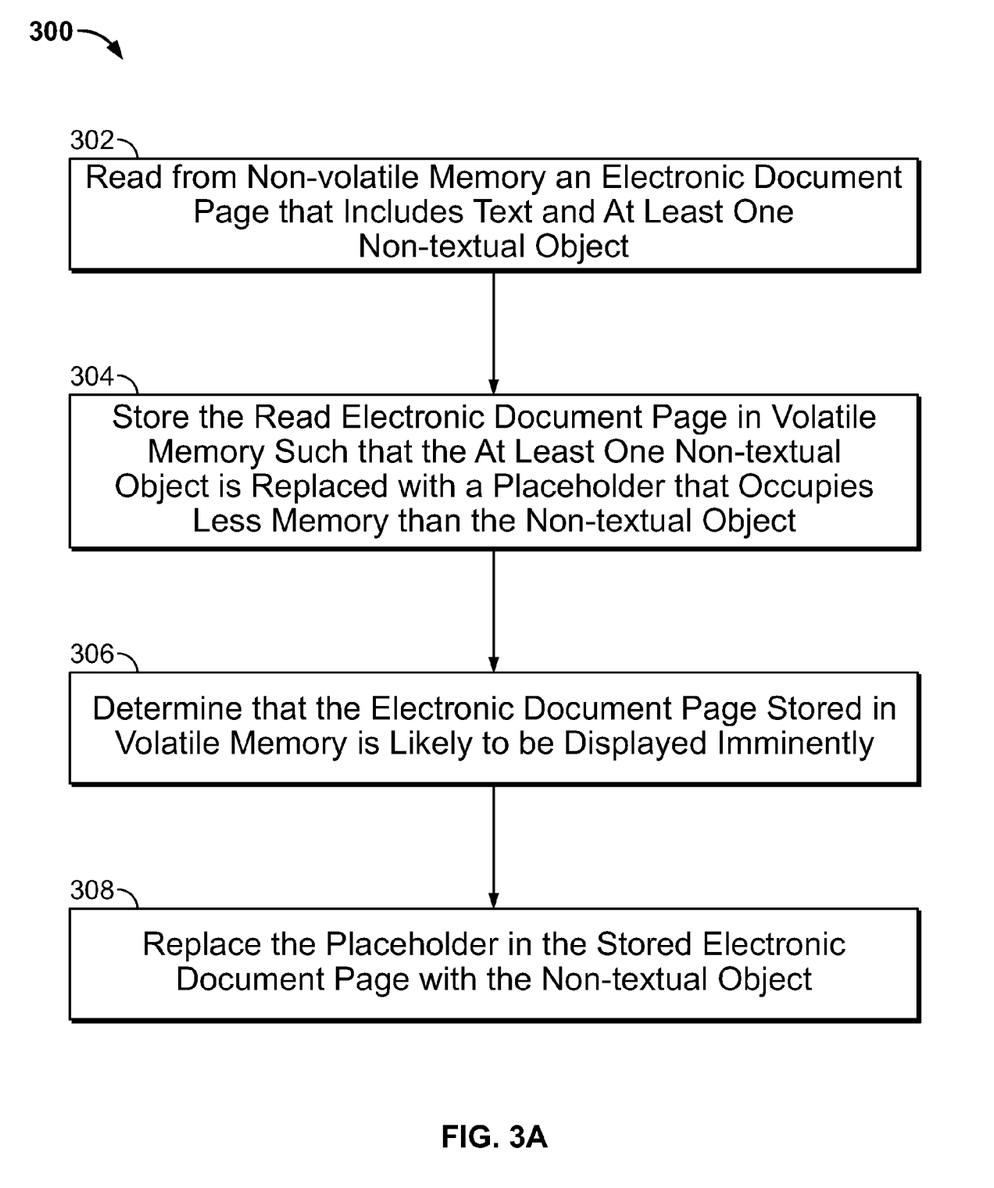
FIGS. 3A and 3B are flowcharts of exemplary processes for inserting object placeholders and dynamically replacing them with the actual objects to which they correspond, and vice versa.

FIG. 3A is a flowchart of an exemplary process 300 that can be used by an eBook reader application for inserting object placeholders and dynamically replacing them with the actual objects (e.g., images) to which they correspond. As shown therein, at 302, the eBook reader application reads a page of an electronic document from non-volatile memory. In this example, the read page includes text and one or more non-textual object, for example, an image. At 304, the eBook reader application stores the read electronic document page in volatile memory such that the at least one non-textual object is replaced temporarily with a placeholder (e.g., a blank rectangle) that occupies less memory (e.g., has a lesser number of bytes) than the non-textual object, thereby conserving RAM. At 306, the eBook reader application determines that the electronic document page stored in volatile memory is likely to be displayed imminently (e.g., the stored electronic document page has newly become immediately adjacent to the currently displayed page). At 308, the eBook reader application replaces the placeholder in the electronic document page with its corresponding non-textual object.

Figure 3B:
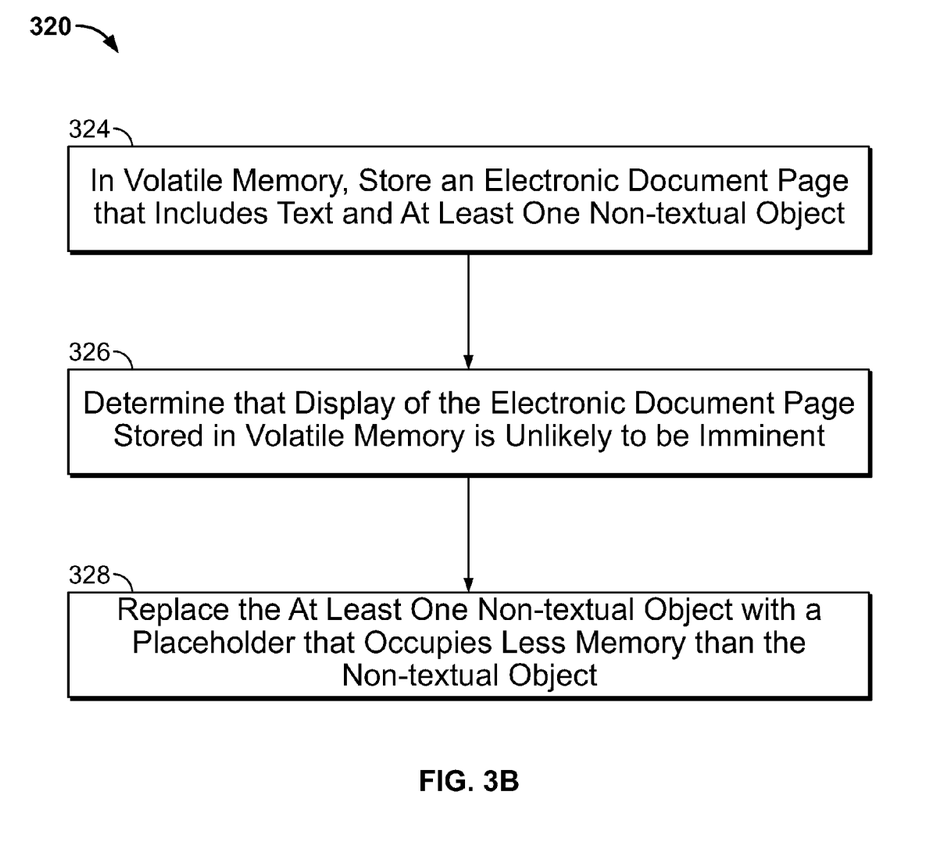

FIG. 3B is a flowchart of an exemplary process 320 that can be used by an eBook reader application to conserve RAM by replacing a non-textual object (e.g., an image) embedded in an eBook page with a placeholder, for example, a blank rectangle having the same dimensions as the image. At 324, the eBook reader application stores an electronic document page in volatile memory. In this example, the electronic document page in question includes text and at least one non-textual object (e.g., an image). At 326, the eBook reader application determines that display of the electronic document page stored in volatile memory is unlikely to be imminent (e.g., the page under consideration is two or more pages away from the currently displayed page). At 328, the eBook reader application replaces the at least one non-textual object (e.g., the image) with a placeholder (e.g., a blank rectangle having the same dimensions as the image) that occupies less memory than the non-textual object.

Figure 4:
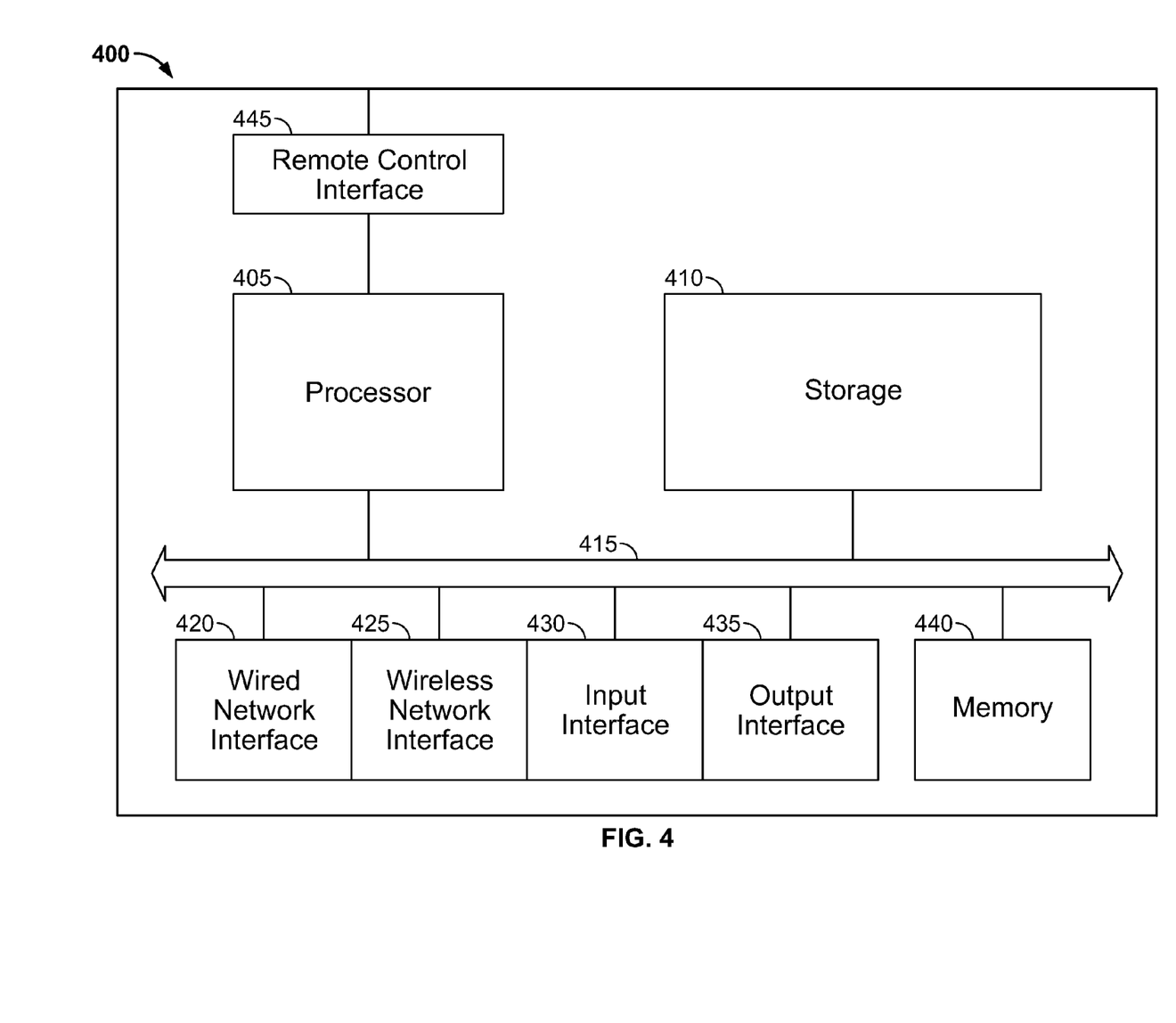
FIG. 4 is a block diagram of an electronic device that can be used for eBook applications.

FIG. 4 depicts an exemplary block diagram of an electronic client device 400 that can be used to for eBook applications. The client device 400 includes a processor 405 configured to control the operation of the client device 400. For example, the processor 405 can control communications with one or more media servers to receive eBooks or other media for presentation on the client device 400. A media server can be any general purpose server that provides access to media content. The media can be received through push and/or pull operations, including through downloading and streaming. The processor 405 also can be configured to generate output signals for presentation, such as one or more streams representing media content or an interface for interacting with a user.

The client device 400 also includes a storage device 410 that can be configured to store information including media, configuration data, user preferences, and operating instructions. The storage device 410 can be any type of non-volatile storage, including a hard disk device or a solid-state drive. For example, media received from an external media server can be stored on the storage device 410. The received media thus can be locally accessed and processed. Further, configuration information, such as the resolution of a coupled display device or information identifying an associated media server, can be stored on the storage device 410. Additionally, the storage device 410 can include one or more sets of operating instructions that can be executed by the processor 405 to control operation of the client device 400. In an implementation, the storage device 410 further can be divided into a plurality of partitions, wherein each partition can be utilized to store one or more types of information. Additionally, each partition can have one or more access control provisions.

A communication bus 415 couples the processor 405 to the other components and interfaces included in the client device 400. The communication bus 415 can be configured to permit unidirectional and/or bidirectional communication between the components and interfaces. For example, the processor 405 can retrieve information from and transmit information to the storage device 410 over the communication bus 415. In an implementation, the communication bus 415 can be comprised of a plurality of busses, each of which couples at least one component or interface of the client device 400 with another component or interface.

The client device 400 may also include a plurality of input and output interfaces for communicating with other devices, including media servers and presentation devices. A wired network interface 420 and/or a wireless network interface 425 each can be configured to permit the client device 400 to transmit and receive information over a network, such as a local area network (LAN) or the Internet, thereby enabling either wired and/or wireless connectivity and data transfer. Additionally, an input interface 430 can be configured to receive input from another device through a direct connection, such as a USB, eSATA or an IEEE 1394 connection.

Further, an output interface 435 can be configured to couple the client device 400 to one or more external devices, including a television, a monitor, an audio receiver, and one or more speakers. For example, the output interface 435 can include one or more of an optical audio interface, an RCA connector interface, a component video interface, and a High-Definition Multimedia Interface (HDMI). The output interface 435 also can be configured to provide one signal, such as an audio stream, to a first device and another signal, such as a video stream, to a second device. Further, a non-volatile memory 440, such as a read-only memory (ROM) also can be included in the client device 400. The non-volatile memory 440 can be used to store configuration data, additional instructions, such as one or more operating instructions, and values, such as one or more flags and counters. In an implementation, a random access memory (RAM) also can be included in the client device 400. The RAM can be used to store media content received in the client device 400, such as during playback or while the user has paused playback. Further, media content can be stored in the RAM whether or not the media content is stored on the storage device 410.

Additionally, the client device 400 can include a remote control interface 445 that can be configured to receive commands from one or more remote control devices (not pictured). The remote control interface 445 can receive the commands through wireless signals, such as infrared and radio frequency signals. The received commands can be utilized, such as by the processor 405, to control media playback or to configure the client device 400. In an implementation, the client device 400 can be configured to receive commands from a user through a touch screen interface. The client device 400 also can be configured to receive commands through one or more other input devices, including a keyboard, a keypad, a touch pad, a voice command system, and a mouse.

In implementation, the computing device can be a portable communications device such as a mobile telephone that also contains other functions, such as PDA and/or music player functions. Exemplary embodiments of portable multifunction devices include, without limitation, the iPad®, iPhone® and iPod Touch® devices from Apple, Inc. of Cupertino, Calif. Other portable devices such as laptops or tablet computers with touch-sensitive surfaces (e.g., touch screen displays and/or touch pads) may also be used. In some implementations, the device is not necessarily a portable communications device, but rather can be a desktop computer, for example, with or without a touch-sensitive surface (e.g., a touch screen display and/or a touch pad). The computing device may include a display and a touch-sensitive surface and/or may include one or more other physical user-interface devices, such as a physical keyboard, a mouse and/or a joystick.

The device can be capable of supporting a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent.

Device 400 as represented in FIG. 4 is only an example and that device may have more or fewer components than shown, may combine two or more components, or a may have a different configuration or arrangement of the components. The various components shown in FIG. 4 may be implemented in hardware, software, or a combination of both hardware and software, including one or more signal processing and/or application specific integrated circuits.

What is claimed is:

1. A method performed by an electronic device, the method comprising:
    displaying, on the electronic device, a fully rendered first section of an electronic document, wherein the electronic device includes volatile memory, non-volatile memory, and an electronic document reading application, the electronic document includes text and one or more existing non-textual objects, and the electronic document is paginated into sections for display on the electronic device according to display attributes of the text and the one or more non-textual objects;
    reading, from the non-volatile memory of the electronic device, text from a second section of the electronic document, the second section including text and an existing non-textual object;
    storing, in the volatile memory of the electronic device, the text of the second section of the electronic document and a placeholder for the non-textual object, the placeholder occupying less memory than the non-textual object, wherein the placeholder is configured to preserve the pagination into sections of the electronic document;
    determining the second section stored in volatile memory on the electronic device is a likely next section to be displayed imminently on the electronic device;
    replacing the placeholder in the volatile memory of the electronic device with the non-textual object from non-volatile memory of the electronic device in response to determining that the second section is the likely next section to be displayed imminently; and
    displaying, on the electronic device, the second section, fully rendered, independent of a time interval between displaying the first section and displaying the second section.

2. The method of claim 1 in which the placeholder preserves at least one characteristic of the non-textual object.

3. The method of claim 1 further comprising:
    determining that the second section is no longer likely to be displayed imminently; and
    replacing the non-textual object with the placeholder in the volatile memory as a result of determining the second section is no longer likely to be displayed, thereby conserving volatile memory of the electronic device.

4. The method of claim 1 in which the non-textual object comprises an image having a height dimension and a width dimension and the placeholder comprises a blank rectangle having the same height and width dimensions as the image, thereby preserving the pagination into sections of the electronic document.

5. The method of claim 1 in which determining the second section is the likely next section to be displayed imminently comprises determining the second section is immediately adjacent to the first section that is currently being displayed.

6. The method of claim 1 in which the non-textual object is an image, and dimensions of the placeholder are substantially identical to dimensions of the image that corresponds to the placeholder, and in which pagination of the electronic document is determined using the dimensions of the image, thereby preserving pagination of the document independent of the placeholder.

7. The method of claim 1 in which determining the second section is the likely next section to be displayed imminently comprises determining the second section is determined to be related to the first section currently displayed when the second section is referenced by the first section currently displayed.

8. The method of claim 1 in which replacing the placeholder in the second section with the non-textual object comprising retrieving the non-textual object from non-volatile memory and inserting the retrieved non-textual object in place of the placeholder.

9. The method of claim 1 in which the placeholder is one or more orders of magnitude smaller than the non-textual object.

10. A method performed by an electronic device, the method comprising:
displaying, on the electronic device, a fully rendered first section of an electronic document, wherein the electronic device includes volatile memory, non-volatile memory, and an electronic document reading application, the electronic document includes text and at least one non-textual object, and the electronic document is paginated into sections for display on the electronic device according to display attributes of the text and the at least one non-textual object;
storing in volatile memory of the electronic device a second section of the electronic document that includes text and at least one existing non-textual object;
determining, by the document reading application, that display of the second section of the electronic document stored in volatile memory on the electronic device is unlikely to be imminent; and
replacing, in volatile memory of the electronic device, the at least one non-textual object with a placeholder that occupies less volatile memory than the non-textual object in response to determining that the second section is unlikely to be displayed imminently, wherein the placeholder is configured to preserve the pagination into sections for display of the electronic document; and
displaying, on the electronic device, the second section, fully rendered, independent of a time interval between displaying the first section and displaying the second section.

11. The method of claim 10 in which the placeholder preserves at least one characteristic of the non-textual object.

12. The method of claim 11 in which the non-textual object comprises an image and the preserved at least one characteristic comprises image dimensions.

13. The method of claim 10 in which the non-textual object comprises an image having a height dimension and a width dimension and the placeholder comprises a blank rectangle having the same height and width dimensions as the image, thereby preserving the pagination into sections for display of the electronic document.

14. The method of claim 10 in which determining that display of the second section of the electronic document is unlikely to be imminent comprises determining that the second section of the electronic document is two or more sections away from the first section currently being displayed.

15. The method of claim 10 in which determining that display of the second section of the electronic document is unlikely to be imminent comprises determining that the second section of the electronic document is unrelated to the first section currently being displayed.

16. The method of claim 10 in which the placeholder is one or more orders of magnitude smaller than the non-textual object, thereby conserving the volatile memory of the electronic device.

17. A system comprising:
an electronic device comprising a processor, a display, and memory, including volatile memory and non-volatile memory, wherein the memory holds instructions that when executed by the processor perform operations including:
display on the electronic device, a fully rendered first section of an electronic document, wherein the electronic document is paginated into sections for display on the electronic device according to display attributes of the text and the one or more non-textual objects;
read from the non-volatile memory of the electronic device text from a second section of the electronic document, the second section includes text and an existing non-textual object;
store, in the volatile memory of the electronic device, the text of the second section of the electronic document and a placeholder for the non-textual object into volatile memory, the placeholder occupying less memory than the non-textual object;
determine that the second section stored in volatile memory is a likely next section to be displayed imminently;
replace, in the volatile memory, the placeholder with the non-textual object in response to determining that the second section is the likely next section to be displayed imminently, wherein the placeholder is configured to preserve the pagination into sections for display of the electronic document; and
display, on the electronic device, the second section, fully rendered, independent of a time interval between displaying the first section and displaying the second section.

18. The system of claim 17 in which the placeholder preserves at least one characteristic of the non-textual object.

19. The system of claim 18 in which the non-textual image comprises an image and the preserved at least one characteristic comprises image dimensions.

20. The system of claim 17 which the non-textual object comprises an image having a height dimension and a width dimension and the placeholder comprises a blank rectangle having the same height and width dimension and the placeholder comprises a blank rectangle having the same height and width dimensions as the image, thereby preserving the pagination into sections of for display of the electronic document.

21. The system of claim 17 in which the instructions to determine the second section is the likely next section to be displayed imminently comprise instructions to determine that the second section is immediately adjacent to the first section currently being displayed.

22. The system of claim 17 in which the instructions to determine the second section is the likely next section to be displayed imminently comprising instructions to determine that the second section is related to the first section currently being displayed.

23. The system of claim 22 in which the second section is determined to be related to the currently displayed first section when the second section is referenced by the currently displayed first section.

24. The system of claim 17 in which the instructions to replace the placeholder with the non-textual object comprise instructions to retrieve the non-textual object from non-volatile memory in place of the placeholder.

25. The system of claim 17 in which the placeholder is one or more orders of magnitude smaller than the non-textual object, thereby conserving volatile memory of the electronic device.

26. The system of claim 17 further comprising instructions to determine that display of third section of the electronic document stored in volatile memory is unlikely to be imminent, the third section of the electronic document including text and at least one other non-textual object; and
    instructions to replace the at least one other non-textual object with a placeholder that occupies less memory than the other non-textual object, thereby conserving volatile memory of the electronic device.

27. The system of claim 26 in which the instructions to determine that the display of the third section of the electronic document is unlikely to be imminent comprise instructions to determine that the third section of the electronic document is two or more sections away from the first section of the electronic document currently being displayed.

28. A non-transitory machine-readable article bearing instructions that when executed by a processor of an electronic device, perform operations comprising:
    display, on the electronic device a fully rendered first section of an electronic document, wherein the electronic device includes volatile memory, non-volatile memory, and an electronic document reading application, the electronic document includes text and one or more non-textual objects, and the electronic document is paginated into sections for display on the electronic device according to display attributes of the text and the one or more non-textual objects;
    read, from the non-volatile memory of the electronic device, text from a second section of the electronic document, the second section includes text and an existing non-textual object;
    store, into volatile memory of the electronic device, the text from the second section of the electronic document and a placeholder for the non-textual object, the placeholder occupying less memory than the non-textual object, wherein the placeholder is configured to preserve the pagination into sections of the electronic document;
    determine the second section stored in volatile memory of the electronic device is a likely next section to be displayed imminently on the electronic device;
    replace the placeholder in the volatile memory of the electronic device with the non-textual object from non-volatile memory of the electronic device in response to determining that the second section is the likely next section to be displayed imminently;
    display, on the electronic device, the second section, fully rendered, independent of a time interval between displaying the first section and displaying the second section.

29. The article of claim 28 in which the placeholder preserves at least one character of the non-textual object.

30. The article of claim 29 in which the non-textual object comprises an image and the preserved at least one characteristic comprises image dimensions.

31. The article of claim 28 in which the non-textual object comprises an image having a height dimension and width dimension and the placeholder comprises a blank rectangle having the same height and width dimensions as the image, thereby preserving the pagination into sections of the electronic document.

32. The article of claim 28 in which the instructions to determine the second section is the likely next section to be displayed imminently comprise instructions to determine that the second section is immediately adjacent to the first section currently being displayed.

33. The article of claim 29 in which the instructions to determine the second section is the likely next section to be displayed imminently comprise instructions to determine that the second section is related to the first section currently being displayed.

34. The article of claim 33 in which the second section is determined to be related to the currently displayed first section when the second section is referenced by the currently displayed first section.

35. The article of claim 28 in which the instructions to replace the placeholder with the non-textual object comprise instructions to retrieve the non-textual object from non-volatile memory and to insert the retrieved non-textual object in place of the placeholder.

36. The article of claim 28 in which the placeholder is one or more order of magnitude smaller than the non-textual object, thereby conserving volatile memory of the electronic device.

37. The article of claim 28 further comprising instructions to determine that display of third section of the electronic document stored in volatile memory is unlikely to be imminent, the third section of the electronic document including text and at least one other non-textual object; and
    replace, in volatile memory, the at least one other non-textual object with a placeholder that occupies less volatile memory than the other non-textual object, thereby conserving volatile memory.

38. The article of claim 37 in which the instructions to determine that the display of the third section of the electronic document is unlikely to be imminent comprise instructions to determine that the third section of the electronic document is two or more sections away from the first section of the electronic document currently being displayed.

39. The article of claim 28, wherein determining that the second section stored in volatile memory of the electronic device is a likely next section to be displayed imminently on the electronic device comprises determining that the second section is adjacent to the first section.

40. The article of claim 39 further comprising instructions to determine that display of third section of the electronic document stored in volatile memory is not adjacent to the first section, the third section of the electronic document including text and at least one other non-textual object; and
    replace the at least one other non-textual object with a placeholder that occupies less memory than the other non-textual object.

41. The article of claim 28, wherein:
    the electronic device comprises an electronic book reader, the electronic document comprises and electronic book, the first section comprises a first fully rendered page of an electronic book, and
    the second section comprises a second page stored in the electronic book reader's volatile memory.

42. The article of claim 41, wherein the second page is an off-screen electronic book page immediately adjacent to the first page.

43. A non-transitory machine-readable article bearing instructions that when executed by a processor of an electronic book reader, perform operations to:
- display, on the electronic device, a fully rendered first section of an electronic document, wherein the electronic device includes volatile memory and non-volatile memory, the electronic document includes text and one or more non-textual objects, and the electronic document is paginated into sections for display on the electronic device according to display attributes of the text and the one or more non-textual objects;
- store in volatile memory of the electronic device a second section of the electronic document that includes text and at least one existing non-textual object;
- determine that display of the second section of the electronic document stored in volatile memory on the electronic device is unlikely to be imminent; and
- replace, in volatile memory of the electronic device, the at least one non-textual object with a placeholder that occupies less volatile memory than the non-textual object in response to determining that the second section is unlikely to be displayed imminently, wherein the placeholder is configured to preserve the pagination into sections for display of the electronic document.

44. An electronic device comprising:
a volatile memory;
a display; and
a processing system programmed with executable instructions that, when executed, performs a machine implemented method comprising:
- displaying a fully rendered first page of an electronic document on the display, wherein the electronic document comprises text and one or more existing non-textual objects each comprising a display image, and the electronic document is paginated based at least in part on display dimensions of the display image of each of the non-textual objects;
- reading, from a non-volatile memory, text of a second page of the electronic document, wherein the second page comprises text and a non-textual object;
- storing the text of the second page and a placeholder for the non-textual object into the volatile memory, wherein the placeholder occupies less volatile memory than the non-textual object, and wherein the placeholder comprises a rectangle having the display dimensions of the display image of the non-textual object, thereby preserving the pagination of the electronic document;
- determining that the second page is likely the next page to be displayed; reading, from the non-volatile memory, the non-textual object including the display image for the non-textual object;
- replacing the placeholder in the volatile memory with the non-textual object including the display image;
- displaying the second page, fully rendered, independent of a time interval between the display of the first page and the request for display of the second page.

45. The system of claim 44, wherein the non-textual object comprises one of a movie, a sound, or an applet.

46. The system of claim 44, wherein determining that the second page is likely the next page to be displayed comprises one of: determining that display of the second page has been requested, or determining that the second page is a page in the electronic document that is immediately preceding or following the displayed first page.

* * * * *